(12) United States Patent
Lang et al.

(10) Patent No.: US 9,392,315 B1
(45) Date of Patent: Jul. 12, 2016

(54) REMOTE DISPLAY GRAPHICS

(71) Applicant: Amazon Technologies, Inc., Reno, NV (US)

(72) Inventors: Christopher Karl Lang, San Jose, CA (US); Ozgur Cem Sen, Santa Clara, CA (US); Bruno Pereira Evangelista, Sunnyvale, CA (US); Edward James Gayles, Tracy, CA (US)

(73) Assignee: Amazon Technologies, Inc., Reno, NV (US)

( * ) Notice: Subject to any disclaimer, the term of this patent is extended or adjusted under 35 U.S.C. 154(b) by 36 days.

(21) Appl. No.: 14/190,241

(22) Filed: Feb. 26, 2014

(51) Int. Cl.
*H04N 7/173* (2011.01)
*H04N 7/00* (2011.01)
*H04N 11/00* (2006.01)
*H04N 21/41* (2011.01)

(52) U.S. Cl.
CPC ....... *H04N 21/4113* (2013.01); *H04N 21/4126* (2013.01)

(58) Field of Classification Search
CPC ......... H04N 5/44; H04N 5/4401; H04N 5/91; H04N 21/482; H04N 21/472; H04N 21/8133; H04N 21/26266; H04N 21/4348; H04N 21/4722; H04N 21/2347; H04N 21/44222; H04N 21/4532; H04N 21/266; H04N 21/654; H04N 7/104; H04N 7/141; H04N 13/0239
USPC .......... 348/552, 734, 725; 725/25, 27, 28, 31, 725/110, 141, 151, 131–133
See application file for complete search history.

(56) References Cited

U.S. PATENT DOCUMENTS

| | | | | |
|---|---|---|---|---|
| 2014/0078402 | A1* | 3/2014 | Weast | 348/730 |
| 2014/0098291 | A1* | 4/2014 | Higashi | 348/552 |
| 2014/0152895 | A1* | 6/2014 | Kazawa | 348/552 |
| 2014/0362293 | A1* | 12/2014 | Bakar et al. | 348/552 |

* cited by examiner

*Primary Examiner* — Trang U Tran
(74) *Attorney, Agent, or Firm* — Seyfarth Shaw LLP; Ilan N. Barzilay; Cyrus A. Miller

(57) ABSTRACT

Images displayed on a source device may be displayed on a target device. The source device may send the target device graphical commands and information to be processed natively at the target device, rather than duplicating the screen of a source device at the target device. Graphical elements to be used by the target device may be sent with the graphical commands or may be sent during out-of-band configuration exchanges between the source and target devices to reduce latency during display sharing.

16 Claims, 11 Drawing Sheets

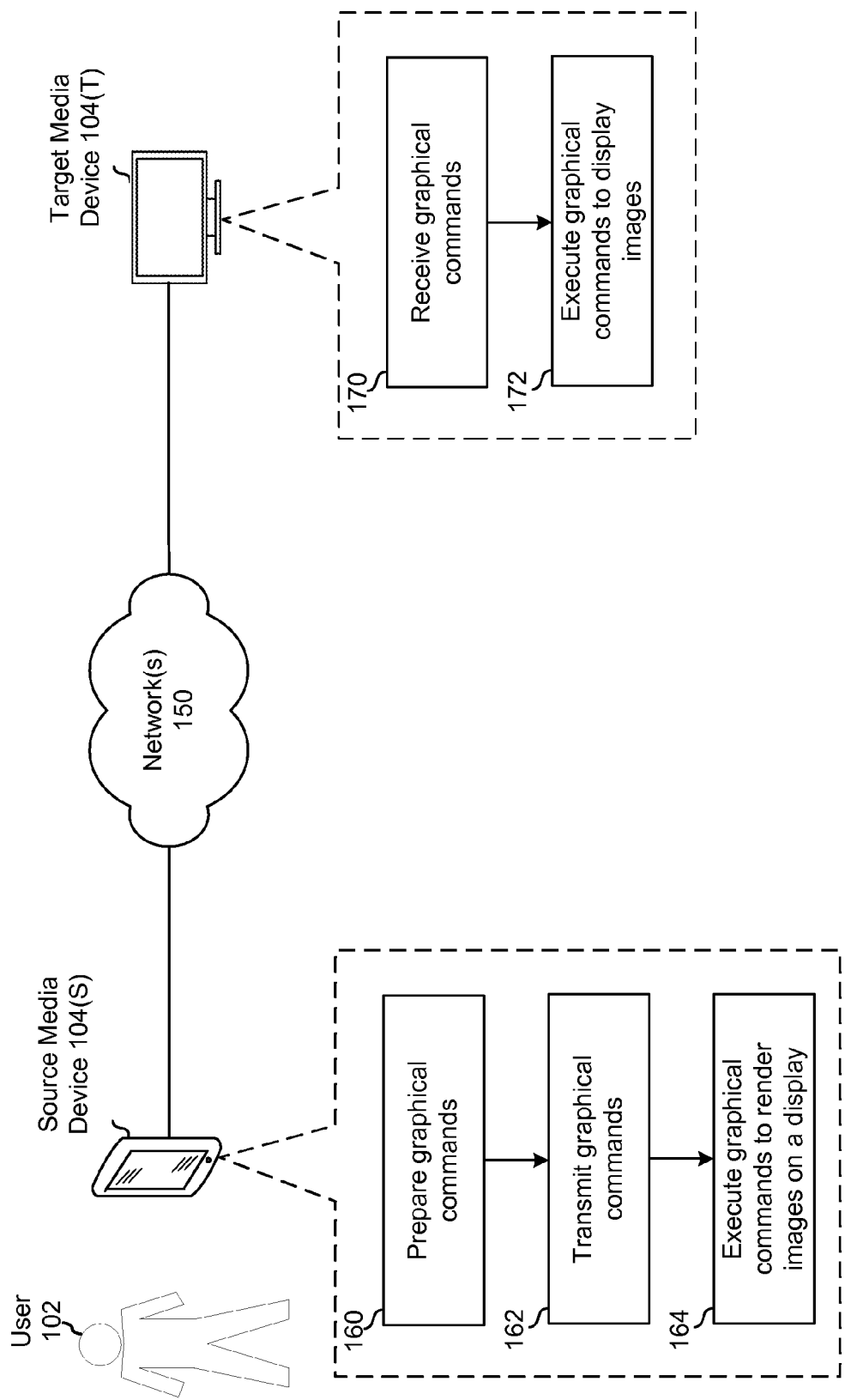

REMOTE DISPLAY GRAPHICS

BACKGROUND

A wide variety of media devices are available for consumers to use for the consumption of an ever growing selection of content. These media devices may include televisions, tablet computers, personal computers, electronic book readers, gaming consoles, set-top boxes, media players, in-vehicle entertainment systems, portable media players, smartphones, and so forth. The content presented by these media devices may include audio, video, electronic books, games, and so forth. The content may be downloaded or streamed from a content provider to the media device.

Users may add or remove different media devices into an environment over time. For example, users may enter a living room with a smartphone or tablet computer, add a Blu-ray or other media player to a home entertainment system, and so forth.

BRIEF DESCRIPTION OF DRAWINGS

FIG. 1A is an illustrative system of a multiple media device system in which graphical information is generated on one media device and displayed on another.

Figure 1B:
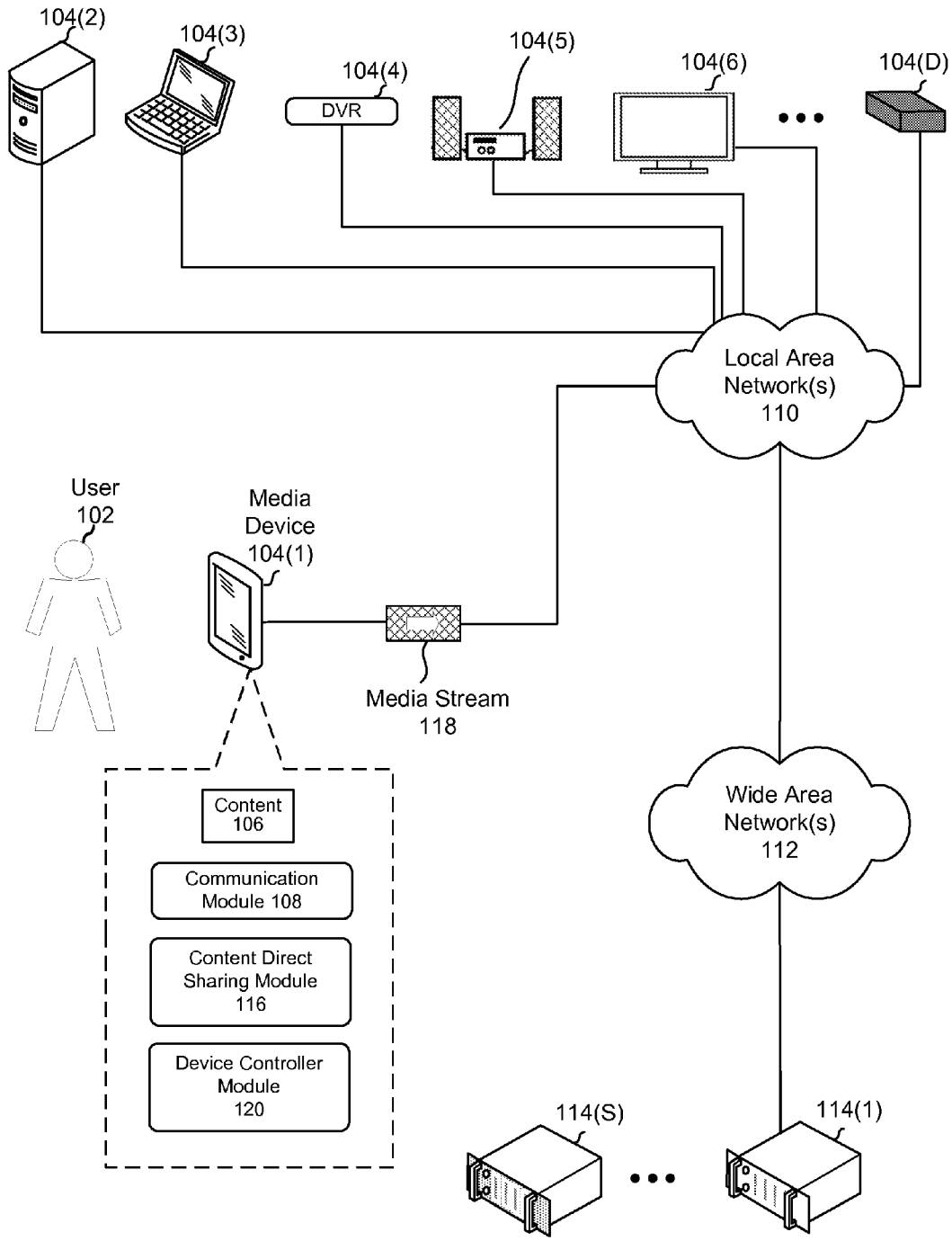
FIG. 1B is an illustrative system of a multiple media device system in which graphical information is generated on one media device and displayed on another.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Media devices may display audio/visual content for display to a user. These media devices may include televisions, tablet computers, personal computers, electronic book readers, gaming consoles, set-top boxes, media players, in-vehicle entertainment systems, portable media players, tablet computers, smartphones, and so forth. The content may include audio, video, electronic books, games, and so forth.

Sometimes a user may wish to take audio/visional content that is generated on one device, such as a mobile phone or tablet, and display that content on another device, such as a large screen television providing a display or home audio video receiver ("AVR") providing sound output. Copying the output of the display of one device to another device may be referred to as screen or display sharing or mirroring. In display sharing, what is seen on the display of one device (called a source device) is sent to another device (called a target device) for simultaneous display on the target device. In certain configurations the source device and target device may display different content, such as in screen extension or other configurations.

A number of techniques have been developed to share content between devices wirelessly without the use of a cord or other physical connector. Miracast and WiDi (wireless display) are two protocols that enable display sharing between devices. Traditional display sharing techniques are typically designed with viewing content with a relatively low level of user interaction, such as streaming a video or movie that is playing on a mobile device to a television or larger display. Such techniques typically focus on true "mirroring", that is taking the video display output of one device and copying that onto another device. Thus, traditional display mirroring first involves generating display data to be shown on a display of a source device prior to sending the display data to a target device.

This focus suffers from a number of drawbacks. First, traditional display mirroring is processor intensive. Traditional mirroring may involve capturing the screen display of a source device, encoding rasterized video display data (to reduce its size for transmission), packetizing the encoded data, and sending the packetized data over a wireless connection. Second, traditional display mirroring may suffer from high latency, as the time needed for processing and wireless transmission may be high. Third, traditional mirroring may result in low quality images on a target device due to both the data encoding (which reduces fidelity) and due to differences between screen size and quality between the target device and source device as data rasterized at a fixed resolution (e.g., 720p) cannot be scaled up or down without a loss of quality. For example display data formatted for a small screen may not look good when displayed on a larger (and potentially higher resolution) screen. Other drawbacks also exist. For display mirroring applications that are sensitive to latency, quality, etc., such as video games, web browsing, or other applications, improved display sharing techniques are desired.

Offered is a such an improved display sharing system and method. Instead of transmitting the processed display data of a source device to be mimicked on a target device (which simply copies the image of the source display onto the target display), the source device may transmit higher level display or graphical instructions/commands to the target device. The target device may then execute those graphical instructions natively at the target device, thus rendering on the target device graphics that are configured for the target device, rather than rendering on the target device graphics that are configured for the source device. For example, traditional display mirroring captures display data to be output on a source device and sends it to a target device. Here, higher level graphical commands are captured and sent to a target device. As the graphical commands require significantly less processing for transmission than display data (for example, encoded video data), processing resources may be freed for other tasks. Further, as the graphical commands are generated earlier in the processing timeline than display data, the graphical commands may be sent to the target device earlier, thus allowing for more flexibility in synchronizing the source and target displays when experiencing transmission delays, or the like. Skipping encoding also improves image quality by bypassing lossy compression which results in loss of image data during the encoding process. Also, the graphic instructions are significantly smaller in terms of data size than encoded video data, thus reducing bandwidth consumption for display sharing and reducing latency.

FIG. 1A illustrates display sharing according to one aspect of the present disclosure. A user 102 operates a source media device 104(S). After a connection and initialization process, described in more detail below, the source media device 104(S) connects over a network 150 to a target media device 104(T). The source media device 104(S) prepares graphical commands (also called graphical instructions), as shown in block 160. The graphical commands may be commands such as calls between an application and a graphics library. The graphical commands may also be instructions sent from a graphics library for execution by a processor, such as a graphics processor. Graphical commands are further discussed below. The graphical commands are transmitted from the source media device 104(S) to the target media device 104(T), as shown in block 162. The graphical commands are then executed by the source media device 104(S) to render images on a display of the source media device 104(S), as shown in block 164. The target media device 104(T) receives the graphical commands, as shown in block 170, and executes the graphical commands to display images on a display of the target media device 104(T), as shown in block 172. By sharing graphical instructions in the manner described herein, wireless display sharing may be improved.

Described below is a system of media devices that may be configured to share graphical information to improve display sharing.

Each media device may include a communication module. The communication module is configured to discover other media devices and the services they support and provide a framework for establishing and using connections with the other media devices. The connections may be authenticated, encrypted, and so forth.

The communication module may be configured to operate in conjunction with a content direct sharing module which sends a media stream to a receiving media device. For example, the content direct sharing module uses connections maintained by the communication module to send audio and video data from a tablet computer to a television for display.

The connection module may be implemented as a software stack executing on the media devices in the system. The connection module on a first media device may differ from the connection module on a second media device. For example, the first media device may include a transport module configured to provide secure sockets over Internet Protocol while the second media device may not. The media devices may include the content direct sharing module, the device controller module, or both.

By providing the communication module, the content direct sharing module, and the device controller module on media devices, the system enhances the user experience. Media devices entering the environment with their associated services may be readily added or removed, and content may be easily shared among those media devices.

FIG. 1B is an illustrative system 100 for providing a multiple media device infrastructure in which various services of the media devices may be discovered and shared. As used in this disclosure, services are modules or groups of instructions which, when executed by a processor, provide a particular set of functionalities. For example, a video streaming service may be configured to participate in a streaming session with a content provider and output video suitable for presentation on a display.

A user 102 is depicted with several media devices 104(1), 104(2), ..., 104(D). While a single user 102 is shown, more than one user 102 may be present. The media devices 104 are configured to present, store, manipulate, or otherwise participate in the consumption of content 106. The media devices 104 may include televisions, tablet computers, personal computers, electronic book readers, gaming consoles, set-top boxes, media players, in-vehicle entertainment systems, portable media players, smartphones, and so forth.

The media devices 104 may execute one or more services. These services may be configured to interact with the content 106 by receiving and processing the content 106 for presentation, generating a stream of content for presentation, providing various functionality, and so forth. The content 106 may include audio, video, electronic books, games, and so forth. The media devices 104 are discussed below in more detail with regard to FIG. 2.

The media devices 104 include a communication module 108. The communications module 108 is configured to support a framework within which availability of different services on different media devices 104 may be distributed and connections between those media devices 104 may be established. These connections may be used to send, receive, control, or otherwise interact with the content 106. The communication module 108 is discussed in more detail below with regard to FIG. 3.

These connections maintained by the communication module 108 may use one or more networks. For example, the network(s) 150 illustrated in FIG. 1A may include local area networks ("LANs") 110 and wide area networks ("WANs") 112 as illustrated in FIG. 1B. The LANs 110 may be supported using an access point topology, ad-hoc peer to peer topology, and so forth. The LANs may be wired, wireless, or a combination. The LANs 110 may be implemented using Ethernet, Wi-Fi, Bluetooth, ZigBee, and so forth. Within the system 100, several different LANs 110 may coexist. For example, media device 104(1) and 104(6) may be connected to one another using Wi-Fi, while the media device 104(2) and 104(5) may be interconnected using Bluetooth. The connections may be between media devices 104 which are on the same or different local area networks 110.

The LAN(s) 110 may connect to one or more WANs 112. The WAN 112 may include one or more public networks such as the Internet, private networks, cellular data networks, or a combination thereof. The WAN 112 may in turn couple to one or more servers 114(1), 114(2), ..., 114(S). The servers 114 may exchange information with the one or more media devices 104. While the servers 114 are depicted as single servers, in some implementations the servers 114 or the functions attributed to the servers 114 may be provided by a plurality of devices. For example, the server 114 may be implemented as a virtualized server executing across a plurality of physical servers.

In one implementation the server 114 or another device coupled to the WAN 112 may provide a proxy service to transfer information from a media device 104(1) to another media device 104(2) using the WAN 112. These media devices 104 may be on the same or different LANs. In another implementation the media devices 104 on different LANs 110 may establish connections with one another over the WAN 112 without using the proxy service.

The media device 104 may include other modules such as a content direct sharing module 116. The content direct sharing module 116 provides a media stream 118 from a first media device 104 to a second media device 104. Certain media devices may be configured differently from other media devices. For example, as illustrated here a tablet computer media device 104(1) may be configured to receive content 106 which may be protected using one or more digital rights management ("DRM") schemes, while the television media device 104(6) may not be configured in this manner. A content direct sharing module 116 executes on both the tablet media device 104(1) and the television media device 104(6). The content direct sharing module 116(1) of the media device 104(1) generates a media stream 118 which is sent, using the LAN 110, to the media device 104(6) which presents at least a portion of the media stream 118. In one aspect, the media stream 118 may include coded content 106 on the source media device 104. In another aspect, the media stream 118 may include graphical commands or calls to be executed by a processor at a target media device to create images for display.

In some implementations the content direct sharing module 116 which is receiving the media stream 118 may be disallowed from storing the media stream in permanent or semi-permanent memory. For example, the content direct sharing module 116 may be configured to store no more than 300 frames of media stream 118 data at any given time and may also be configured to display received frames in a streaming manner. The content direct sharing module 116 may also be configured to establish a secured pathway to the display of the media device 104 executing the content direct sharing module 116, to reduce the likelihood of interception of the media stream 118 by other applications or services executing on the media device 104.

The content direct sharing module 116 may include modules such as a virtual screen module, a virtual audio device module, or both. The virtual screen module may be configured to acquire graphical command data which is designated for presentation on the display of the media device 104. The virtual screen module may also be configured to receive graphical command data, such as the media stream 118 from another media device 104. The media stream 118 may include graphical commands and associated graphical data. The virtual screen module may send the graphical commands and graphical data to a processor of the media device for rendering and display on a display of the media device 104. This communication may be facilitated by the communication module 108. The virtual audio device module may be configured to acquire audio data which is designated for presentation on speakers of the media device 104. Likewise, the virtual audio device module may be configured to receive audio data, such as from the media stream 118 and present that audio data on the speakers of the media device 104.

The content direct sharing module 116 may be configured to send media streams 118 to multiple media devices 104, either as a multicast or as separate streams. For example, the media device 104(1) may provide the media stream 118 to the media devices 104(5) and 104(6) for presentation using a multicast. In another example, the media device 104(1) may provide a first media stream 118(1) to the media device 104(5) and a second media stream 118(2) to the media device 104(6).

The content direct sharing module 116 may be configured to mirror presentation of content 106, or provide different information to different media devices 104. In one implementation first content 106 may be presented on the media device 104 providing content direct sharing while different second content is sent to another media device 104. Continuing the example, the media device 104(1) may present a user interface for controlling presentation of the content 106, while a media stream 118(1) comprising video is sent to the media device 104(6) for presentation on a display and a media stream 118(2) comprising audio is sent to the media device 104(5) for presentation by the speakers.

The media device 104 may also include a device controller module 120. The device controller module 120 may be configured to generate media presentation data. In one aspect, the media presentation data may include an address and content identifier, which when processed by the receiving media device, initiates a transfer from a server 114(1) to the receiving media device over the LAN 110 and/or WAN 112. The address and content identifier may include, for example, a uniform resource locator ("URL") which directs the target media device to content on the server for retrieval and display on the target media device. Content may be shared from the server 114 to a media device 104 through the transmission of graphical commands as described below.

Figure 2:
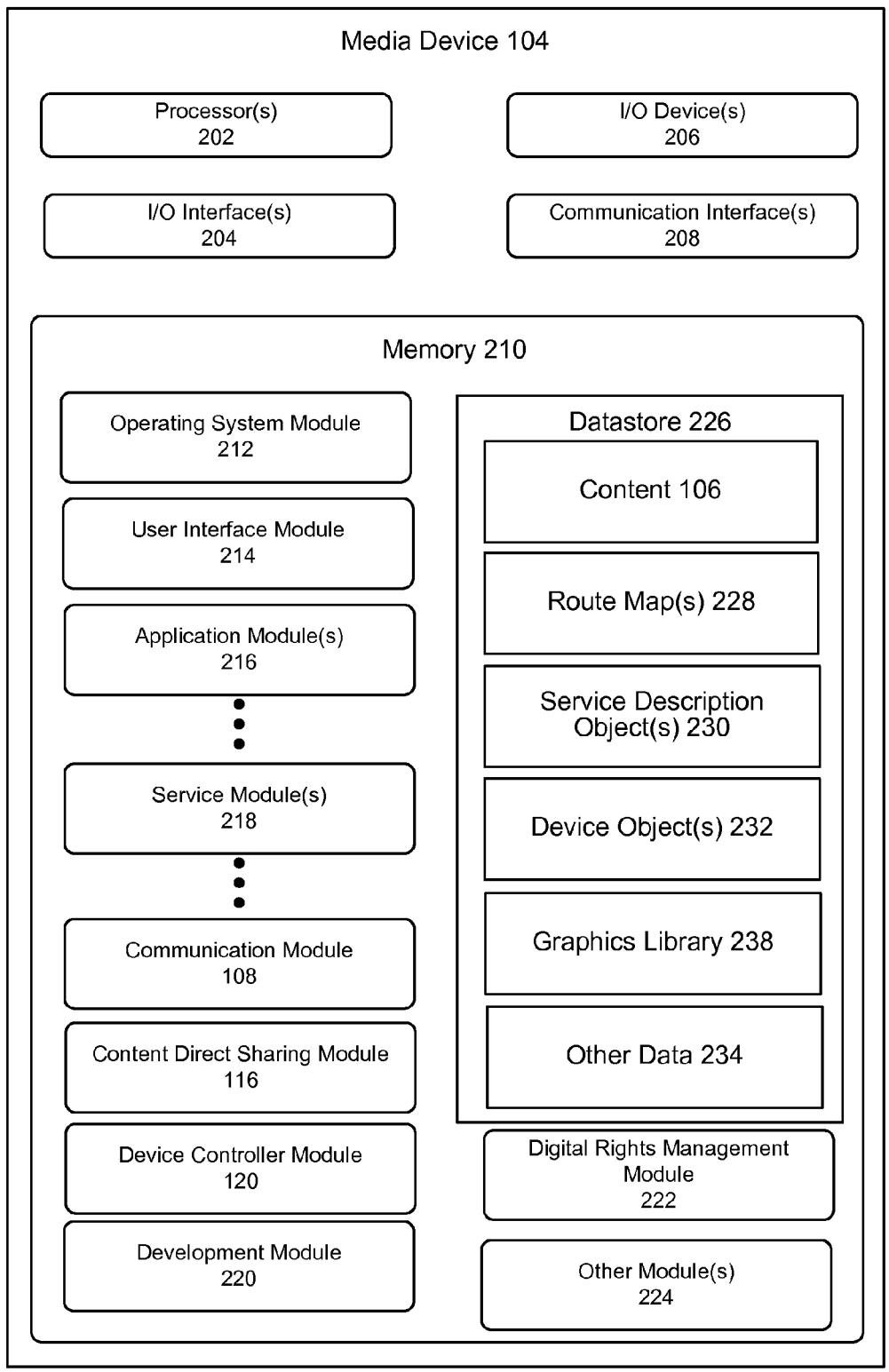
FIG. 2 illustrates a block diagram of a media device configured to support the multiple media device system.

FIG. 2 illustrates a block diagram 200 of the media device 104 configured to support the multiple media device infrastructure. The media device 104 may include one or more processors 202 configured to execute one or more stored instructions. The processors 202 may comprise one or more cores. The media device 104 may include one or more input/output ("I/O") interface(s) 204 to allow the processor 202 or other portions of the media device 104 to communicate with other devices. The I/O interfaces 204 may comprise inter-integrated circuit ("I2C"), serial peripheral interface bus ("SPI"), Universal Serial Bus ("USB") as promulgated by the USB Implementers Forum, RS-232, one or more media device interfaces such as High Definition Multimedia Interface ("HDMI") as promulgated by HDMI Licensing LLC, TOSLINK as promulgated by Toshiba Corp., analog video, analog audio, IEEE 1394 as promulgated by the Institute for Electrical and Electronics Engineers, and so forth.

The I/O interface(s) 204 may couple to one or more I/O devices 206. The I/O devices 206 may include input devices such as one or more of a camera, a microphone, a touch sensor, a button, and so forth. The I/O devices 206 may also include output devices such as one or more of a display, audio speakers, haptic output device and so forth. In some embodiments, the I/O devices 206 may be physically incorporated with the media device 104 or may be externally placed.

The media device 104 may also include one or more communication interfaces 208. The communication interfaces 208 are configured to provide communications between the media device 104 and other devices, such as other media devices 104, routers, access points, the servers 114, and so forth. The communication interfaces 208 may include personal area networks, wired and wireless local area networks ("LANs") 110, wide area networks ("WANs") 112, and so forth. For example, Ethernet, Wi-Fi, Bluetooth, ZigBee, and so forth.

The media device 104 may also include one or more busses or other internal communications hardware or software that allow for the transfer of data between the various modules and components of the media device 104.

As shown in FIG. 2, the media device 104 includes one or more memories 210. The memory 210 comprises one or more computer-readable storage media ("CRSM"). The CRSM may be any one or more of an electronic storage medium, a magnetic storage medium, an optical storage medium, a quantum storage medium, a mechanical computer storage medium and so forth. The memory 210 provides storage of computer readable instructions, data structures, program modules and other data for the operation of the media device 104.

The memory 210 may include at least one operating system (OS) module 212. The OS module 212 is configured to manage hardware resource devices such as the I/O interfaces 204, the I/O devices 206, the communication interfaces 208, and provide various services to applications or modules executing on the processors 202. Also stored in the memory 210 may be one or more of the following modules. These modules may be executed as foreground applications, background tasks, daemons, and so forth.

A user interface module 214 is configured to provide a user interface to the user 102 using the I/O devices 206 and accept inputs received from the I/O devices 206. The user interface may include one or more visual, audible, or haptic elements. For example, the user interface may be configured to provide a graphic user interface, an audible user interface, and so forth.

One or more application modules 216 may be stored in the memory 210. The one or more application modules 216 provide functionality which interacts with the user 102. For example, an application module 216 may be a game which is playable by the user.

One or more service modules 218 may be stored in the memory 210. The service modules 218 provide one or more services comprising one or more data processing functionalities to other service modules 218, application modules 216, or other modules. The one or more functionalities may be associated with presentation of the content 106 on one of the media devices 104. For example, the service modules 218 may be configured to stream audio or video from a server for presentation, transfer and present images, transfer files, and so forth. Other service modules 218 may provide functionality such authentication to confirm information such as the ownership or affiliation of a particular media device 104.

As described above, the communication module 108 is configured to establish and support communications between the media device 104 other media devices 104, servers 114, and other devices. The communication module 108 may provide an abstraction to allow the application modules 216, service modules 218, and so forth to readily interact with corresponding modules on other media devices 104. The communication module 108 may access the communication interfaces 208 to exchange information between the devices. The communication module 108 is discussed in more detail below with regard to FIG. 3.

As described above, the content direct sharing module 116 provides a media stream 118 from a first media device 104 to a second media device 104. In one implementation the content direct sharing module 116 may provide for concurrent presentation between the first media device 104 and the second or more media devices 104. In another implementation, the content direct sharing module 116 may suppress or discontinue presentation on the first media device 104 while presentation continues on the second or more media devices 104. For example, a media presentation application module 216 on the tablet media device 104(1) may be receiving a stream of a movie. The content direct sharing module 116 may request from the communication module 108 connections to the pair of television media device 104(6) and 104(7). The communication module 108 may establish these connections and the movie may appear simultaneously on the television media devices 104(6) and 104(7), while a user interface allowing for control of the media presentation application module 216 may remain on the tablet media device 104(1) to facilitate the user's 102 control of the movie playback. The movie may be stored and streamed from one of the media devices 104 (such as the tablet media device 104(1)) or may be stored at another location, such as a server 114, or other location.

A development module 220 may be stored in the memory 210 of the media device 104. The development module 220 may include various libraries, modules, functions, and so forth such as may be present in a software development kit or other toolset. The development module 220 may implement functions such as "default service implementation" in which an initial set of basic service housekeeping issues are defined. The development module 220 may also implement a "transport manager" configured to select and manage particular transport modules for use based on parameters such as access level associated with the service, what transport module the service was discovered over, and so forth. The transport modules are discussed in more detail below with regard to FIG. 3.

A digital rights management module 222 may provide support for presenting or processing content 106 which is protected using one or more digital rights management schemes. Other modules 224 may also be present. For example, a speech recognition module may be present and used to accept spoken input from the user 102 as received from a microphone I/O device 206.

The memory 210 may also include a datastore 226 to store information. The datastore 226 may use a flat file, database, linked list, tree, or other data structure to store the information. In some implementations, the datastore 226 or a portion of the datastore 226 may be distributed across one or more other devices including servers, network attached storage devices and so forth.

The datastore 226 may store content 106, either in its entirety or a portion. One or more route maps 228 may be stored. The route maps 228 provide information about services on other media devices 104 and the routing to access those services.

Service description objects ("SDO") 230 may be stored. The SDO 230 provides information such as service identifiers, access information, encryption information, and so forth, associated with a particular service as provided by a service module 218. The service identifiers may be used to indicate a particular service which is available. The access information may include details on account names, passwords, supported transports, and so forth. The encryption information may include data such as encryption keys, protocols, and so forth.

Device objects ("DOs") 232 may also be stored in the memory 210. These may include a service description array indicating available services local to a particular media device 104, universally unique identifier ("UUID") associated with the particular media device 104, friendly name for the particular media device 104, transport information, and so forth. Transport modules and the associated information are discussed below with regard to FIG. 3.

The memory 210 may also store one or more graphics libraries 238. The graphics library 238 may be configured as an implementation of an application programming interface (API) to coordinate interactions between applications and a graphics processor when generating graphics. An application programming interface may include a set of functions or routines, executed in software and/or hardware, to specify how computing components should interact with each other. An API may be in the form of a library that includes specifications for routines, data structures, object classes, variables, etc. A graphics library 238 may include graphical information for use in generating graphics. The one or more graphics libraries 238 may be configured for particular applications, operating systems, hardware, etc. As used here, the term graphics library may include the API and an instantiation of the API. In one example, one or more of the graphics libraries 238 may be an API implementation that interfaces between an application and lower levels according to the Open Graphics Library (OpenGL), Open GL|ES, EGL, or other standards.

Other data 234 may also be stored. For example, the other data 234 may include user preferences, configuration files, and so forth.

Figure 3:
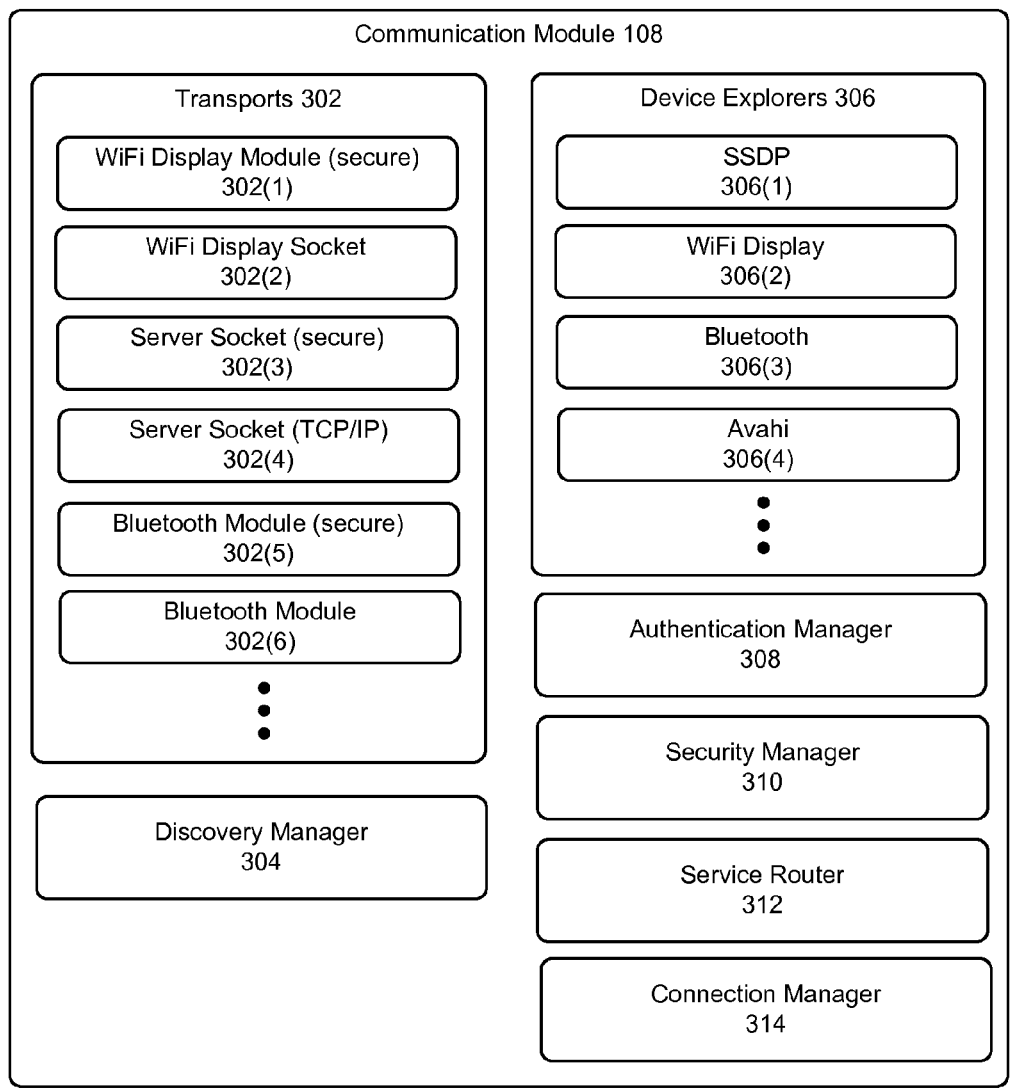
FIG. 3 illustrates a block diagram of a communication module configured to support the multiple media device system.

FIG. 3 illustrates a block diagram 300 of the communication module 108 configured to support the multiple media device infrastructure. In some implementation the communication module 108 and the subordinate modules may be implemented as a background process. The communication module 108 may include modules including one or more transport modules 302, a discovery manager 304, one or more device explorers 306, an authentication manager 308, a security manager 310, a service registrar 312, a connection manager 314, and so forth.

The transport modules 302 are configured to provide functionality at a transport layer and establish and maintain communication channels that transfer bits from one media device 104 to another device. In one implementation the transport modules 302 may operate at layer 4 of the Open Systems Interconnection ("OSI") model. The media device 104 may have multiple transport modules 302 available contemporaneously.

The communication module 108 provides a simplified abstraction to the application modules 216, service modules 218, and other modules. A module requiring communication services may use this simplified abstraction to readily initiate communication, without the module knowing the details of the particular transport module and type of connection involved. For example, a requesting service module 218(1) on the media device 104(1) may initiate a request to communicate with the corresponding service module 218(2) on the media device 104(5). This communication may use one or more of several different transport modules 302, but this complexity may be hidden from the requesting service module 218(1) and from the receiving service module 218(2).

Due to the modular nature of the communication module 108, additional transport modules 302 may be easily added without requiring re-engineering of the communication module 108. For example, a transport module 302 supporting an infrared optical transport mechanism may be added without disrupting other existing transport modules 302 or other operational aspects of the communication module 108.

The transport modules 302 may include a secured Wi-Fi Display module 302(1) and a Wi-Fi Display socket 302(2). These transport modules 302(1)-(2) may be compliant with the Miracast standard promulgated by the Wi-Fi Alliance, the Intel Wireless Display ("WiDi") standard developed by Intel Corporation, or both. The Wi-Fi Display transport module allows for peer-to-peer exchange of media information. This exchange may be encrypted in the case of the secured transport, or unencrypted in the case of the unsecured transport. The transport modules 302 may include transport modules configured for the exchange of graphical data and instructions, as described below.

Transport modules 302 which are based on Internet Protocol ("IP") server sockets may be provided, such as a secure server socket 302(3) and an unsecure server socket 302(4). These transport modules 302(3)-(4) may support wired or wireless communication.

Transport modules 302 may also support the Bluetooth standard as promulgated by the Bluetooth Special Interest Group. A Bluetooth module which is secured 302(5) may be provided, as well as a Bluetooth module 302(6) which is unsecured.

Other transport modules 302 may also be provided. For example, a transport module may provide transport functionality over a wireless WAN, such as LTE, 3G, 4G, and so forth. The transport modules 302 may implement a portion of the standard, specification, or protocol. For example, the transport modules associated with Bluetooth may omit application level functions in the Bluetooth specification, such as profiles.

A discovery manager 304 manages the device explorers 306. The discovery manager 304 provides an interface which abstracts the mechanism provided by the device explorers 306 to search for media devices 104 and discover the services associated with those media devices. The discovery manager 304 provides to other modules the results of the discovery, while concealing from other modules consuming these results the complexity of the search and discovery processes which may differ from transport module 302 to transport module 302.

The device explorers 306 are modules which are configured to gather device object 232 data using one or more of the transport modules 302. The device explorers 306 may process the device objects 232 to generate one or more route maps 228. The device explorers 306 may also be configured to respond to the device explorers 306 on other devices to distribute device objects 232, route maps 228, or other information.

The device explorers 306 may operate in "active" or "passive" modes. The active mode requires some interaction, such as user 102 approval, before a service is advertised as being available. The active mode may be time limited, such that the associated service is only discoverable for a particular period, so long as the user 102 is activating a particular command or button, and so forth. For example, the service module 218 providing output for the tablet media device 104(1) may be placed in active mode, such that the display and speakers of that media device 104(1) are only discoverable when the user 102 explicitly makes them so.

In comparison, the device explorers 306 may operate in a passive mode. In the passive mode, the service modules 218 are available without user interaction. For example, the AVR media device 104(5) and the television media device 104(6) may be configured to operate in passive mode such that any of the media devices 104 in the system 100 may see the resources they have available to share.

Depicted here are device explorers 306 including for simple service discovery protocol ("SSDP") 306(1), Wi-Fi Display 306(2), Bluetooth 306(3), Avahi 306(4), and so forth. The SSDP 306(1) allows for advertisement and discovery of services over an IP-based network using user datagram protocol ("UDP") packets for transfer using one or more of the transport modules 302. The Avahi explorer 306(4) may implement a version of Avahi as developed by Lennart Poettering and others. Avahi provides a zero configuration protocol using least a portion of the multicast domain name service ("DNS"), DNS-based service discovery ("DNS-SD"), or both to discover and configure an IP-based network without user intervention.

The authentication manager 308 is configured to authenticate the media devices 104 in the system 100 and authorize communications with one or more of those media devices 104. This authentication may be accomplished within the LAN 110, or may involve external resources such as the servers 114. In one implementation, the authentication may involve parsing a device identifier received from another media device 104 to determine a manufacturer or model number. Previously determined devices 104 may then be allowed to communicate. In another implementation, a first media device 104 may interrogate the server 114 to authenticate a second media device 104. For example, the tablet media device 104(1) may discover the presence of the television media device 104(6). Continuing the example, the tablet media device 104(1) may send data about the television media device 104(6) to the server 114, to confirm that connectivity is permitted. The authentication manager 308 may manage this exchange.

In some implementations the authentication manager 308, or another module, may be configured to authenticate the identity of the user 102. In one implementation, access levels to services available on the LAN 110 may be based at least in part on user identity. For example, the user 102(1) who lives in a home environment where the system 100 is implemented may have "family" access when using the device of another user 102(1) in that environment.

A security manager 310 is configured to manage use of encryption and other techniques to prevent unauthorized use of the media device 104. For example, the security manager 310 may be configured to require a predetermined encryption for administrative access to the communication module 108. The security manager 310 may work in conjunction with the authentication manager 308 to manage authentication tokens granted to other media devices 104. The security manager 310 may permit different access levels. These different access levels permit connectivity and operation with different restrictions.

In one implementation, the access levels may include levels such as "family," "friend," "first party devices," and "guest." The family level allows connections only from another media device 104 which is registered or otherwise associated with a common account. The friend level allows access to a specifically "trusted" media device 104. The first party device level indicates that the media device 104 shares a common manufacturer, distributor, or other attributes. The guest level is similar to friend level access, but has a limited duration in time. For example, the media device 104 may be considered a friend device when on the same LAN 110. Particular service modules 218 may define the access levels they will operate with.

The service router 312 is configured to process incoming connections. The service router 312 may route the connection to the authentication manager 308 for processing. Once authenticated and authorized, the service router 312 may direct the traffic to the appropriate service module 218.

The connection manager 314 manages the active connections in the media device 104. The user interface module 214 may be configured to present to the user 102 various prompts or information, such as whether to permit a particular connection, whether to seek out a particular connection, and so forth.

When one or more media devices desire to exchange content (either as a source device or as a target device), they may enter a discover mode where each device makes its presence known to other devices. In this manner a source device may detect a target device and vice-versa. A communication connection may then be established between the source device and target device. The communication connection may be established through the exchange of messages including instructions to connect the devices for purposes of exchanging information, such as graphical information. Graphical information may include graphical commands and/or graphical data, as described below. Following the establishment of a communication connection, the devices may exchange initialization information and beginning a display sharing session. A display sharing session is a session during which graphical commands for execution and display are sent from the source media device to the target media device.

Devices that wish to connect to each other after device discovery may engage in a handshake and connection setup that may be controlled by various components discussed above with regard to FIGS. 2 and 3. As part of device discovery or connection setup between two or more devices, a device may advertise its capabilities, including available services, communication protocols and constraints, hardware capabilities, operating OS, and the like.

When a source media device connects to a target media device for purposes of display sharing, an initialization process may be executed by the devices. The initialization process may occur prior to establishing a display sharing session. During this initialization process various graphical data may be sent to the target device from the source device. Graphical data may include data to be used or referred to when executing a graphical command to generate display data. For example, graphical data may include data used by a graphics processor. Examples of graphical data include graphical assets such as geometric information, vectorized drawings, vector graphics, geometric graphics, vectorized geometries, vectorized geometric primitives, textures, images, or the like. Graphical data may include data to be stored in a graphics library. As part of the initialization process, graphical assets may be sent and preloaded into one or more graphics libraries of the target prior to a display sharing session.

Other information such as configuration information may be exchanged between the source media device and target media device either during initialization or as part of device discovery/connection setup. Configuration information may include information regarding settings, capabilities, or other configurations of the respective devices. For example, configuration information may include display settings, graphics parameters, frame rates, bit rates, or other communication parameters may also be exchanged during this initialization. Configuration information may also include information regarding the different resources (both hardware and/or software) used by the different devices to allow format-based conversion of information from one device to another. For example, the source and target media devices may exchange information about each other's operating system, hardware drivers, processor capabilities, or other device settings. The source and target media devices may also exchange information about the display configurations of each other's displays, such as the respective display's make/model, resolution, refresh rate, or the like. Other types of configuration information may also be exchanged.

Such out-of-band exchanges of graphical data, configuration information, etc. may continue over a back channel separate from any display sharing sessions while the source media device and target media device remain capable of communicating with each other. Further, additional data that may be needed by the target media device to properly display the content may also be sent by the source in-band during a display sharing session as needed. Such data may be sent as part of a display sharing communications, during lulls in display sharing communications, or otherwise.

If communication conditions between the source media device and target media device are such that the target media device is unable to receive all desired graphical elements prior to commencement of a display sharing session, certain graphical elements may be prioritized over others for transmission to the target media device. Further, different version of certain graphical elements (such as low resolution textures, etc.) may initially be sent to the target media device while more complete versions (such as high resolution textures, etc.) may be sent later as communication conditions allow.

The source media device may keep a record of what graphical information it has sent to the target media device or may otherwise be aware of what graphical information is available to the target media device (such as being informed of the target media device's graphics library contents during initialization). Thus the source media device may send the target media device only the graphics assets the target media device does not already have, thereby reducing the amount of bandwidth used for the display sharing operations.

Figure 4:
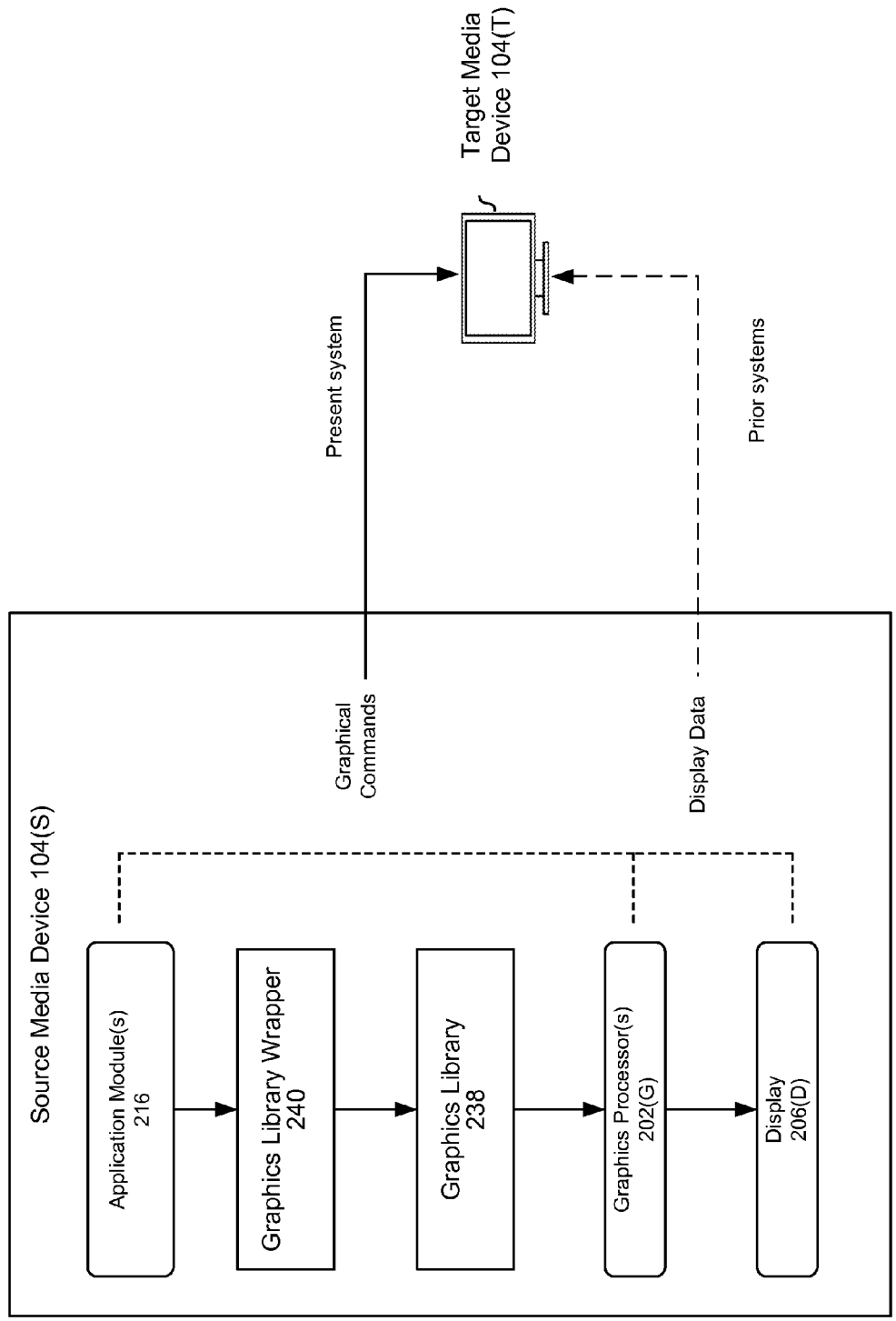
FIG. 4 illustrates generation of graphical commands for execution and display according to the prior art.

FIG. 4 illustrates an example configuration for generating graphical commands and display data in a source media device 104(S). An application module 216, such as a software application operating on a device, generates graphical commands for processing by lower levels to create images for a display 206(D). The application module 216 may generate a graphical command such as a call to a graphics library 238. The graphics library 238 may be configured for the particular hardware of the media device, such as a graphics library 238 including graphical data configured for the graphics processor 202(G) of the media device. The graphics library 238 may receive the call from the application module 216 and convert that call to an instruction that may be executed by a driver, graphics processor (such as graphics processor 202(G)), or other component to generate display data (such as to be displayed on display 206(D)). As part of generating the instruction to the lower level driver or graphics processor, the graphics library 238 may use graphical data such as the graphical assets discussed above. Although FIG. 4 illustrates the graphics library 238 as communicating directly with the graphics processor 202(G), a driver (not pictured) for the graphics processor 202(G) may be located in between the graphics library 238 and the graphics processor 202(G). In that situation, the graphics library 238 may generate graphical commands for operation by the driver. A display driver (also not pictured) may also be located between the graphics processor 202(G) and the display 206(D).

The graphics library 238 may include an application interface, such as an API or instantiation of an API, to interface between the application and the lower level driver/processor. The graphics library 238 may operate according to the OpenGL standard. OpenGL describes a language independent API for generating commands for execution by a graphics processor. As shown in FIG. 4, a graphics library wrapper 240 or binder may process calls from the application module 216 prior to sending them to the graphics library 238. The graphics library wrapper 240 may provide a different interface to convert calls from the language of the application module 216 to the language of the graphics library 238. For example, Java OpenGL is a wrapper that allows OpenGL to be used in the Java programming language. The graphics library wrapper 240 may itself be an API. Calls to the graphics library wrapper 240 or graphics library 238 may be called graphics calls.

As illustrated in FIG. 4, during operation, an application, such as an application operated by application module 216, may make an graphics call that is sent to the graphics library wrapper 240. That graphics library wrapper 240 may then process the call, for example by translating the call, and send the resulting translation, which is itself a call to the graphics library 238. The graphics library 238 may then process the call to create an instruction, such as a command in driver code, or the like to a driver, graphics processor 202(G) or other processor to create rendered images to be sent to the display 206(D) of the media device.

In one example, an application, such as a video game, is operated by the appropriate application module 216. During operation of the game, the application module 216 makes a call to the graphics library wrapper 240. The graphics library wrapper 240 then determines the appropriate graphics library 238 call for executing the desired graphics operation. The graphics library 238 then passes an instruction to the graphics processor 202(G). The graphics processor 202(G) then creates display data that may be sent to a display driver or display 206(D) to actually create and show images on the display 206(D) of the device.

Figure 5:
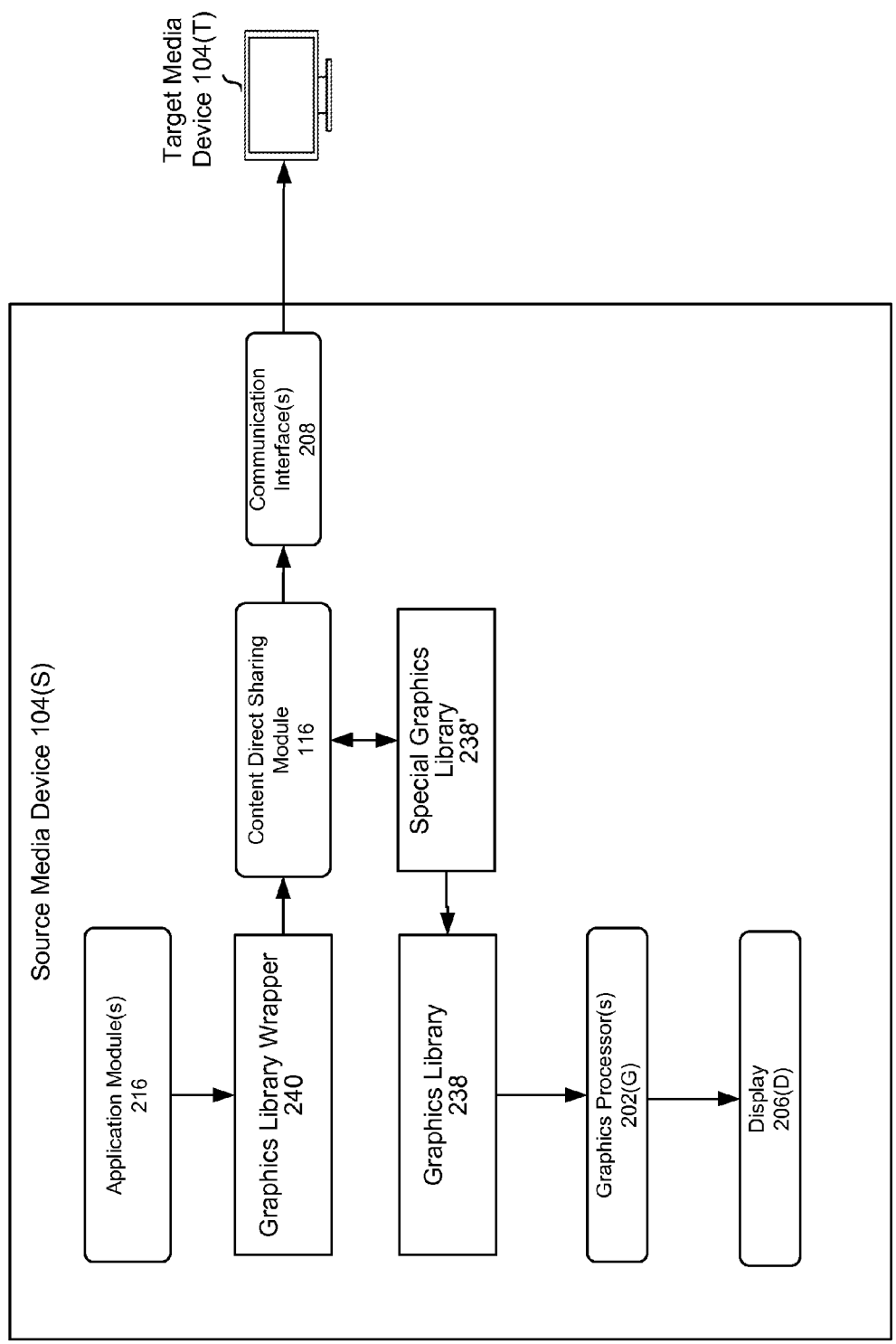
FIG. 5 illustrates generation of graphical commands for execution, display, and display sharing according to one aspect of the present disclosure.

To operate display sharing, the calls to the graphics library 238 or graphics library wrapper 240, or the graphical instructions from the graphics library 238 to the graphics processor 202(G), or other graphical commands, of a source media device may be duplicated and routed to a target media device for native graphics generation on the target media device to perform display mirroring as described above. As shown in FIG. 5, in one aspect, graphics calls from a graphics library wrapper 240 are sent to another module of a media device, such as the content direct sharing module 116, or other module. The content direct sharing module 116 may then duplicate the graphics calls from the graphics library wrapper 240 and send them and/or other graphical information to a communication interface 208 to be sent to a different, i.e. target, media device. The communication module 108 (not shown) may mediate exchanges between the content direct sharing module 116 and the communication interface 208. In this configuration the graphics library wrapper 240 may intercept and manipulate calls from the application module 216 prior to the calls being processed by the graphics library 238 or sent to the content direct sharing module. The content direct sharing module 116 may also send the target media device graphics calls to the graphics library wrapper 240 or graphical instructions to the graphics processor 202(G).

In one aspect, the present system differs from prior display mirroring techniques in that the present system is configured to send graphical commands from a source media device to a target media device. Prior display mirroring techniques are configured to send display data between devices. The difference between graphical commands and display data is that graphical commands are higher level instructions for executed by higher layer computing resources such as an API or processor and display data is instructions and data used by lower layer computing resources, such as instructions configured for a monitor or display. Graphical commands may include commands like clear screen, set vertex buffer, draw elements, set texture, and the like. Graphical commands may operate on graphical data such as vector data used to draw lines and shapes (including indices, vertices, lines, points, curves, shapes, polygons, color, tangent, etc.), non-vector data (such as textures, etc.), graphical data address information, or other data used by a processor to render graphics.

Graphical commands may operate on pre-rasterized data. Rasterization describes a process for mapping shapes to pixels for display on a display device. Rasterization typically occurs at the lower levels of a graphics pipeline, such as that shown in FIG. 4. Pre-rasterized data may be data that is described in a vector graphics (i.e., shape) format rather than in a raster image (i.e., pixels or dots) format. Such pre-rasterized data may include the graphical data and graphical assets mentioned above, including vector data, non-vector data, and the like. Graphical commands may also operate on pre-rendered data. Rendering describes a process for generating an image from a model. Pre-rendered data may be data from which a pixel image may be generated. Such pre-rendered data may include, for example, model or scene files including geometry data, viewpoint data, texture data, lighting data, shading data, and the like. Display data may include post-rendered or post-rasterized image data such as bitmap data, video data, or pixel data for use by a display. Pixel data may include data to generate images for particular points on a display or image. Pixel data may include, for one or more pixels, color, brightness, and/or location. Graphical commands generally do not include display data. Graphical commands generally involve further execution or further processing in order to generate displayable data.

Display data may typically be configured or formatted for the particular display the images are to be sent to. For example, display data may be created in a format designed for a 720i resolution display, where pixel information is generated for a high-definition screen with 1280×720 pixels and where display data is output in a manner designed for an interlaced display. In another example, if display data is configured for a screen with a refresh rate of 60 Hz, the display data may include information to refresh the screen 60 times per second. In a traditional display mirroring system, this display data (i.e., formatted for a 720i, 60 Hz screen) would be created and sent both to the screen of a source device and to a target device for display. Such display data may include, for example, encoded video data such as H.264/MPEG-4 encoded video, as may be used by traditional display mirroring system. If, however, the target device had a screen that was configured differently from the source screen (for example, the target device had a 1020p, 120 Hz screen, or a 4K screen), the result would be the target device displaying display data configured for the source screen that was inferior to display data had it been formatted for the native target screen. In the present system, by sending graphical commands from the source media device to the target media device, the target media device may natively execute the graphical commands to create display data configured and formatted for the screen of the target device.

The differences between graphical commands and display data may be further explained in reference again to FIG. 4. As illustrated in FIG. 4, graphical commands may include the graphics calls from an application module 216 to an API such as the graphics library wrapper 240 or the graphics library 238. Graphical commands may also include API calls from the graphics library wrapper 240 to the graphics library 238. Graphical commands may also include instructions sent to the driver or graphics processor 202(G), such as those sent from the graphics library 238. Display data may include processed images, such as rendered or rasterized images created by a processor such as a graphics processor 202(G) and output to a frame buffer or a display. Commands from the application module 216 through the graphics processor 202(G) are generally considered graphical commands and data from the graphics processor 202(G) to the display 206(D) are generally considered display data. In prior display sharing systems, display data is sent to a target media device 104(T). In the present system, graphical commands are sent to the target media device 104(T). The graphical commands sent to the target media device 104(T) may also include other graphical information such as graphical data as explained herein, such as graphical resources to generate images for a display.

In another aspect, as shown in FIG. 5, a source media device may be configured with a special graphics library 238'. The special graphics library 238' may act as the main graphics library in a device, allowing it to capture graphical commands from any application or system process. As shown in FIG. 5, the special graphics library 238' may intercept graphical commands which are then sent to the graphics library 238 of the source media device. The special graphics library may exist on both the source media device 104(S) and on the target media device 104(T). The special graphics library 238' may be configured to assist with display sharing. That is, the special graphics library 238' may be an implementation of an API configured in a manner designed to efficiently exchange graphical commands and graphical data between the source media device 104(S) and the target media device 104(T), for example by using a standard set of instructions or resources that may be shared among devices that are configured for display sharing as described herein.

The special graphics library 238' may be located between the graphics library wrapper 240 and the graphics library 238. In one aspect, the content direct sharing module 116, which may also coordinate communications between devices may be located between the graphics library wrapper 240 and the special graphics library 238'. In this manner graphics calls (such as those from the graphic library wrapper 240, or elsewhere) or other graphical information may be reformatted or otherwise manipulated by the content direct sharing module 116 (or other module) to be compatible with the special graphics library 238'. 238'. For example, certain graphical assets may be referred to by a particular memory address in the graphics library 238 but may be at a different location in the special graphics library 238'. Thus, the memory address in a call from the graphics library wrapper 240 may be changed prior to being sent to a target device. In another example, the special graphics library 238' may be written in another language from the graphics library wrapper (which itself is typically written to interact with the graphics library 238 rather than the special graphics library 238'). Thus the content direct sharing module 116 (or other module) may change the language of the call prior to passing the call to the special graphics library 238'. In this situation the content direct sharing module 116 (or other module) may mediate calls between the graphics library wrapper 240 and the graphics library 238. In another example, if the special graphics library 238' may be configured to operate as a mediator between calls between the graphics library wrapper 240 and the graphics library 238 or other interface with the hardware drivers.

In one aspect, all graphics and images appearing on the display of the source media device 104(S) may be processed through the special graphics library 238'. This may make display sharing easier when the special graphics library 238' is also be replicated on one or more different target media devices 104(T). For example, graphics calls of the source device that are manipulated into the format of the special graphics library 238' may be more easily handled by the target device when the target device is also configured with a special graphics library 238' configured to interact with the graphics library of the target device. Similarly, certain graphical resources (i.e. graphical assets) may be referred to in the same way in the special graphics library 238' of a source media device as in the special graphics library 238' of the target media device. In this manner, calls to a special graphics library 238' of the source device may be sent directly to the target media device for execution at the target media device. Thus, after receiving graphics calls from the graphics library wrapper 240, the content direct sharing module 116 may manipulate the graphics calls according to the configurations of the special graphics library 238' and send the manipulated graphics calls to both the special graphics library 238' for processing on the source media device and to the communication interface 208 to be sent to a target media device.

If a source media device 104(S) is configured with a special graphics library 238', but no target media device is detected and/or enabled, graphical commands will not be forwarded and may be processed by the source media device 104(S) as normal. If a target media device is detected and display sharing is activated, graphical information may otherwise be manipulated prior to sending to the target media device to assist in processing the graphical information by the target media device. This manipulation may also include altering or removing certain unnecessary graphical commands at the source media device prior to sending to the target media device in order to conserve bandwidth and otherwise improve display sharing efficiency. For example, the content direct sharing module 116 (or other appropriate module) may detect and/or remove redundant state changes or no-effect commands. The content direct sharing module 116 may also detect and/or removed duplicated or overlapping memory blocks in resources. The content direct sharing module 116 may also perform compression (potentially lossless compression) of certain resources to reduce transmission payload size. The content direct sharing module 116 may also coordinate asynchronous transmission of resources that are not needed immediately, such as textures, etc. as described in reference to the out-of-band initialization and configuration processes.

The graphical commands, which may initially be configured for the source device (such as based on the source device's OS, or other setting) may be reconfigured prior to being sent to the target device. Graphical data, which may initially be configured for the source device may also be reconfigured prior to being sent to the target device. If graphical data is reconfigured, corresponding graphical command(s) may also be reconfigured so the graphical command sent to the target device is configured to expect and operate on the new graphical data. For example, graphical commands may be translated into a language that may be more easily understood at the target side, the graphical commands may be reformatted based on a configuration of the target device (such as based on the target device's OS, or other setting), may be reformatted based on the special graphics library 238' of the target device, or otherwise. In another example, vector data for operation on by a graphical command may be transformed to match a screen area of the target device by scaling the geometries of the vector data up or down. In another example, a graphics command may be changed to alter the drawing area and resolution to match the target device. In another example a graphical command (or group of graphical commands) may be changed to another graphical command (or group of graphical command) if a target device does not support the original graphical command(s) and/or if the substituted graphical command(s) would otherwise perform the desired task. For example, shaders may be used to process vertices, geometries, etc. In another example, a pre-rendered image referred to by a graphical command may be converted to a format or configuration that the target device can read and use. In another example, output frame buffers may be reconfigured to match the target device display and to handle gamma issues to adjust for brightness differences.

Figure 6:
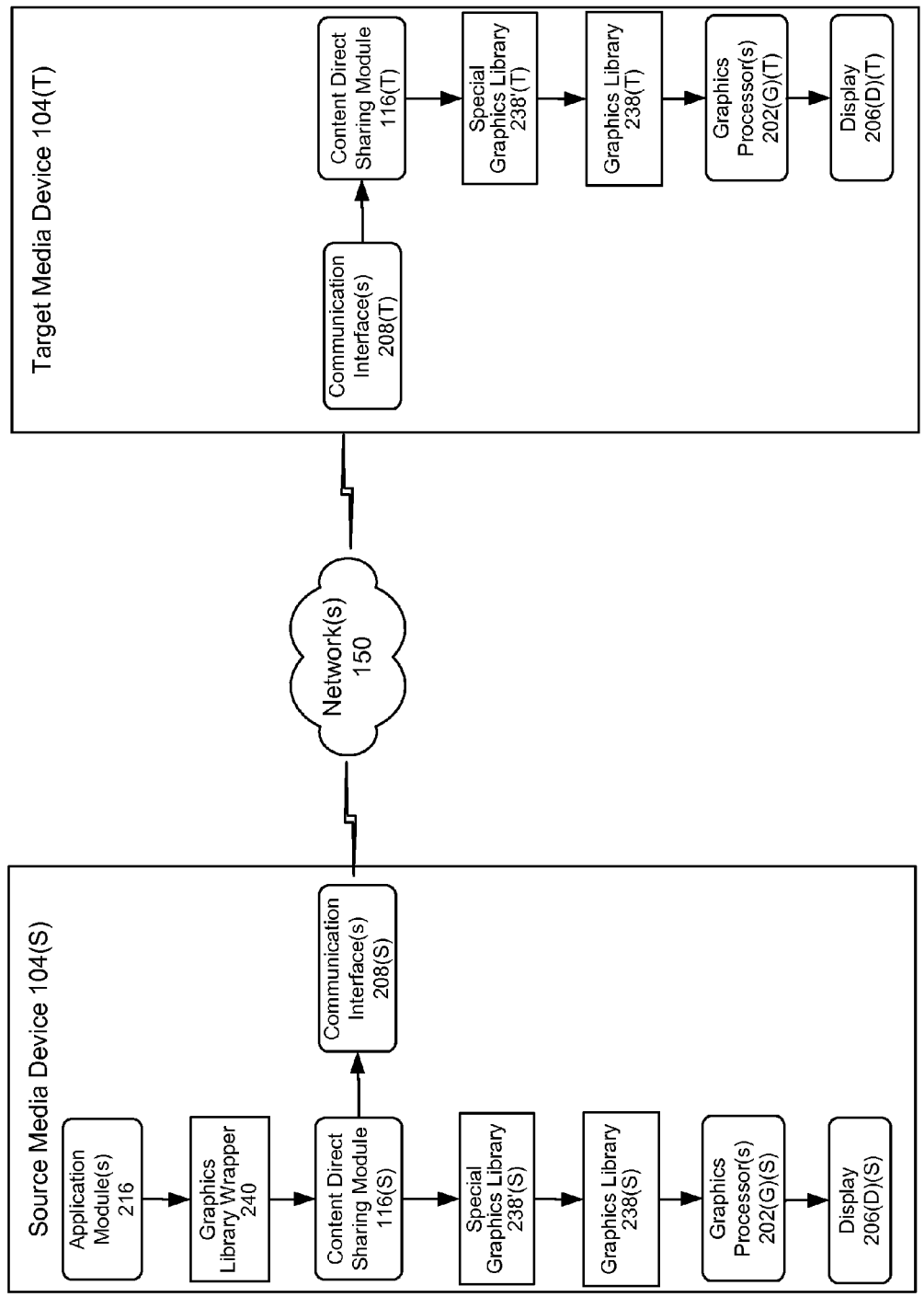
FIG. 6 illustrates generation of graphical commands for execution, display, and display sharing according to one aspect of the present disclosure.

FIG. 6 illustrates an example of an exchange of graphical information between a source media device 104(S) and a target media device 104(T) for display mirroring. While the source media device 104(S) and target media device 104(T) may each include other components, only those used in this example exchange are illustrated. An application module 216 at the source media device 104(S) generates graphical commands for the graphics library wrapper 240. The graphics library wrapper 240 generates further graphical commands, such as calls to a graphics library and sends those commands to the content direct sharing module 116(S) of the source media device 104(S). The content direct sharing module 116(S) then manipulates the graphical commands based on a format of the special graphics library 238'(S) and sends the manipulated graphical instructions to the special graphics library 238'(S) and to the communication interface 208(S).

The source media device 104(S) may then generate the appropriate graphics for its own display by passing instructions from the special graphics library 238' (S) to the graphics library 238(S) and to the graphics processor 202(G)(S) which will then execute the instructions and use data from one or more graphics libraries to generate the graphics for the display 206(D)(S).

The manipulated graphical commands are sent wirelessly over the network 150 to the communication interface 208(T) of the target media device 104(T). The received commands may then be passed to an application or module running on the target media device 104(T) that is capable of processing the instructions. As illustrated, this module is the content direct sharing module 116(T), however a different application or module may be used. The manipulated graphical instructions are then sent to the special graphics library 238'(T) of the target media device 104(T) which then processes the instructions for communication with the graphics library 238(T) and the graphics processor 202(G)(T) for eventual execution and rendering on the display 206(D)(T) of target media device 104(T). Thus, referring again to FIG. 1B, the media stream 118 sent from a source media device to a target media device may take the form of graphical commands to be executed at the target media device. In prior systems, the media stream 118 would be display data, such as specific pixel instructions (such as video data or rasterized pixel data output from graphics processor 202(G)(T)) to be shown on display 206(D)(S). By sending graphical commands from an API level layer instead of display data, such as pixel data, the target device may render its own graphics based on the configurations of its processor(s), display, etc. Although FIG. 6 illustrates a graphical command from the graphics library wrapper 240 being sent from the source media device 104(S) to the target media device 104(T), any graphical command generated in the source media device 104(S) may be sent to the target media device 104(T) for display sharing.

In another configuration of the system, a special graphics library 238' may not be used by the source media device and/or the target media device. In this configuration, graphical information at the API level (i.e., created by the application module 216(S)), graphical information output from the graphics library wrapper 240(S) and/or graphical information output from the graphics library 238(S) may be sent from the source media device 104(S) to the target media device 104 (T). The sent graphical information is then used by the target media device 104(T) to natively generate graphics and images by the processor(s) of the target media device for rendering on the display 206(D)(T) of the target media device 104(T). The graphics libraries of the target media device 104(T) may store graphical data sent by the source media device 104(S) during the display sharing session or sent as part of out-of-band communications such as the initialization process discussed above. In one aspect, a source media device may also send timing information or instruction to one or more target devices to coordinate display of the images among the devices (source and/or target(s)) so that images are synchronized and/or displayed at the correct time when viewed by a user.

Figure 7:
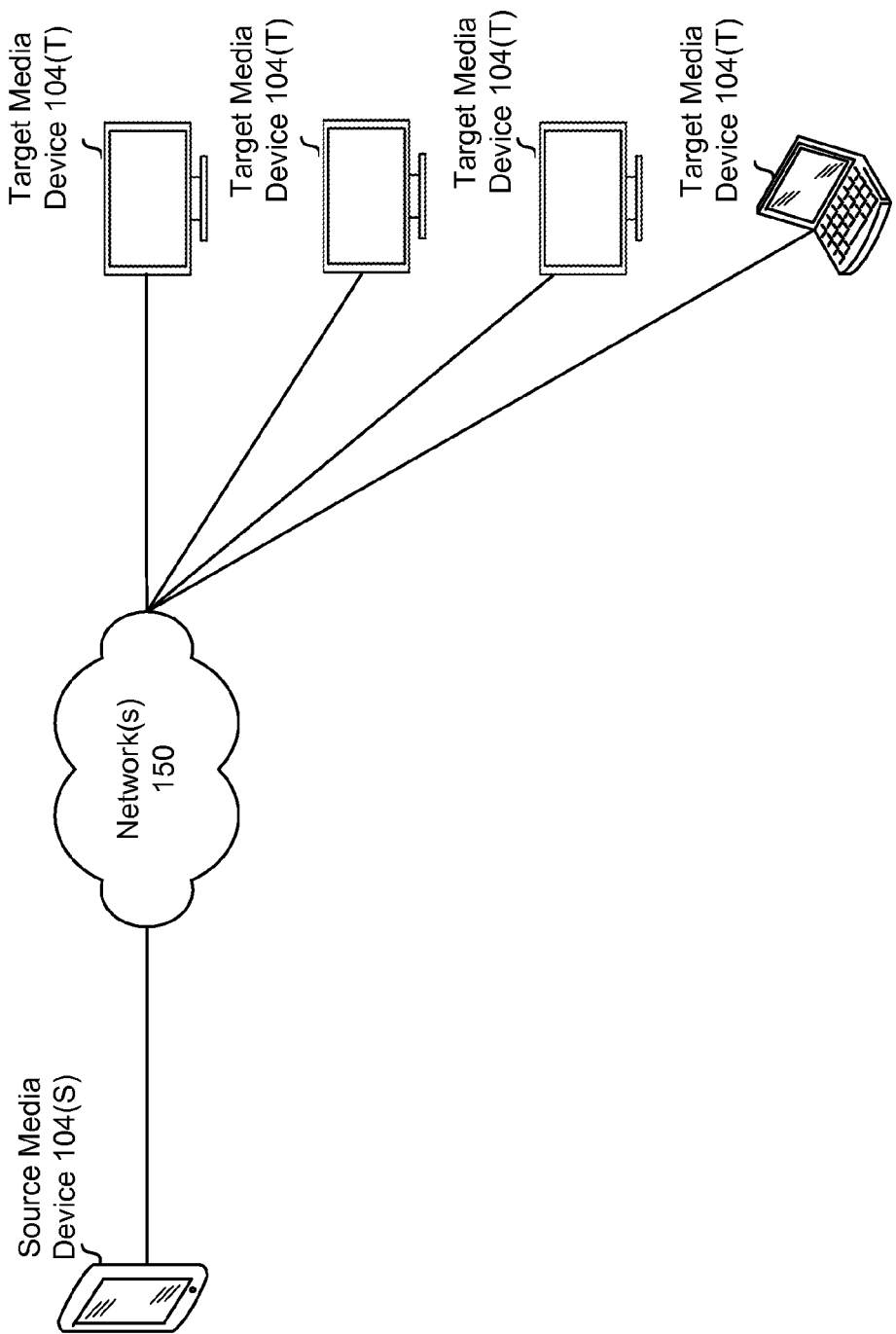
FIG. 7 illustrates display sharing according to one aspect of the present disclosure.
Figure 8:
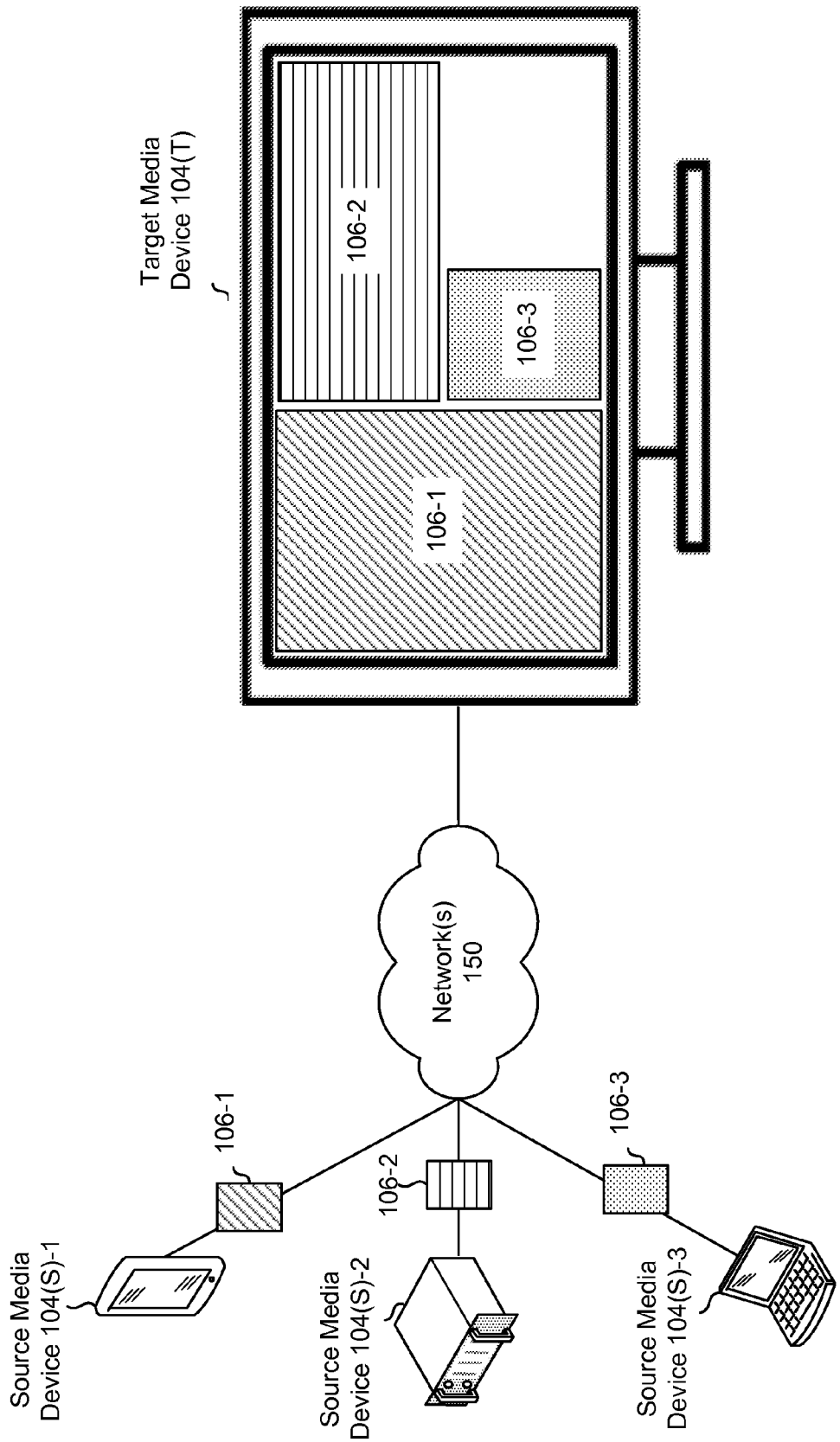
FIG. 8 illustrates display sharing according to one aspect of the present disclosure.

The display sharing system may also allow for display sharing among more than two devices. For example, as shown in FIG. 7, a source media device 104(S) may send graphical commands across the network 150 to multiple target media devices 104(T). The individual target devices may then process the graphical commands natively for each respective display of the target media devices 104(T), thereby sharing the display of the source media device 104(S) among multiple targets. In another example, as shown in FIG. 8, a target media device 104(T) may receive content from multiple source media devices 104(S)-1, 104(S)-2, and 104(S)-3. The target media device 104(T) may divide its own display to show the content from the respective source media devices (content 106-1, 106-2, and 106-3) on different portions of the target's display, possibly leaving some of the target's display for other content not received from a separate device. The content sent by the source media devices to the target media device is represented by graphical commands generated by the individual source media devices as illustrated in FIG. 6 and described above.

Figure 9:
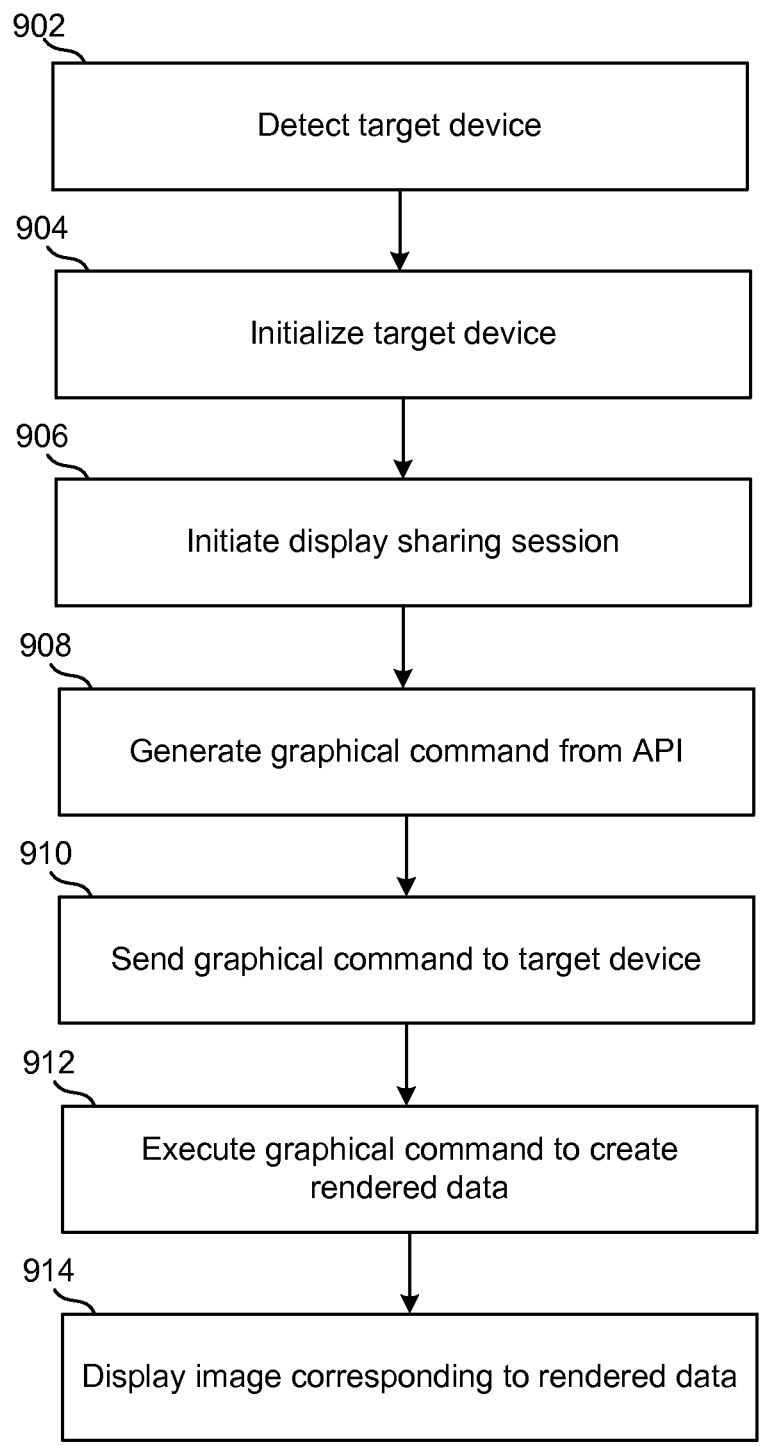
FIG. 9 illustrates display sharing according to one aspect of the present disclosure.

FIG. 9 illustrates display sharing operations as performed by a source device according to one aspect of the present disclosure. A source media device 104(S) may detect a target device, as shown in block 902. The source media device 104(S) may then initialize the target device, as shown in block 904. The initialization may comprise exchanging configuration information with the target device, sending the target device graphical data, or other processes. The source media device 104(S) may then initiate a display sharing session with the target device, as shown in block 906. The source media device 104(S) may then generate graphical commands from an API, as shown in block 908. The graphical commands may be executable by a graphics processor and my reference information contained in a graphics library. The source media device 104(S) may then send the graphical command to the target device, as shown in block 910. The source media device 104(S) may then execute the graphical command to create rendered image data, as shown in block 912. The rendered image data may be formatted for the display of the source media device 104(S). The source media device 104(S) may then display an image corresponding to the rendered data, as shown in block 914.

Figure 10:
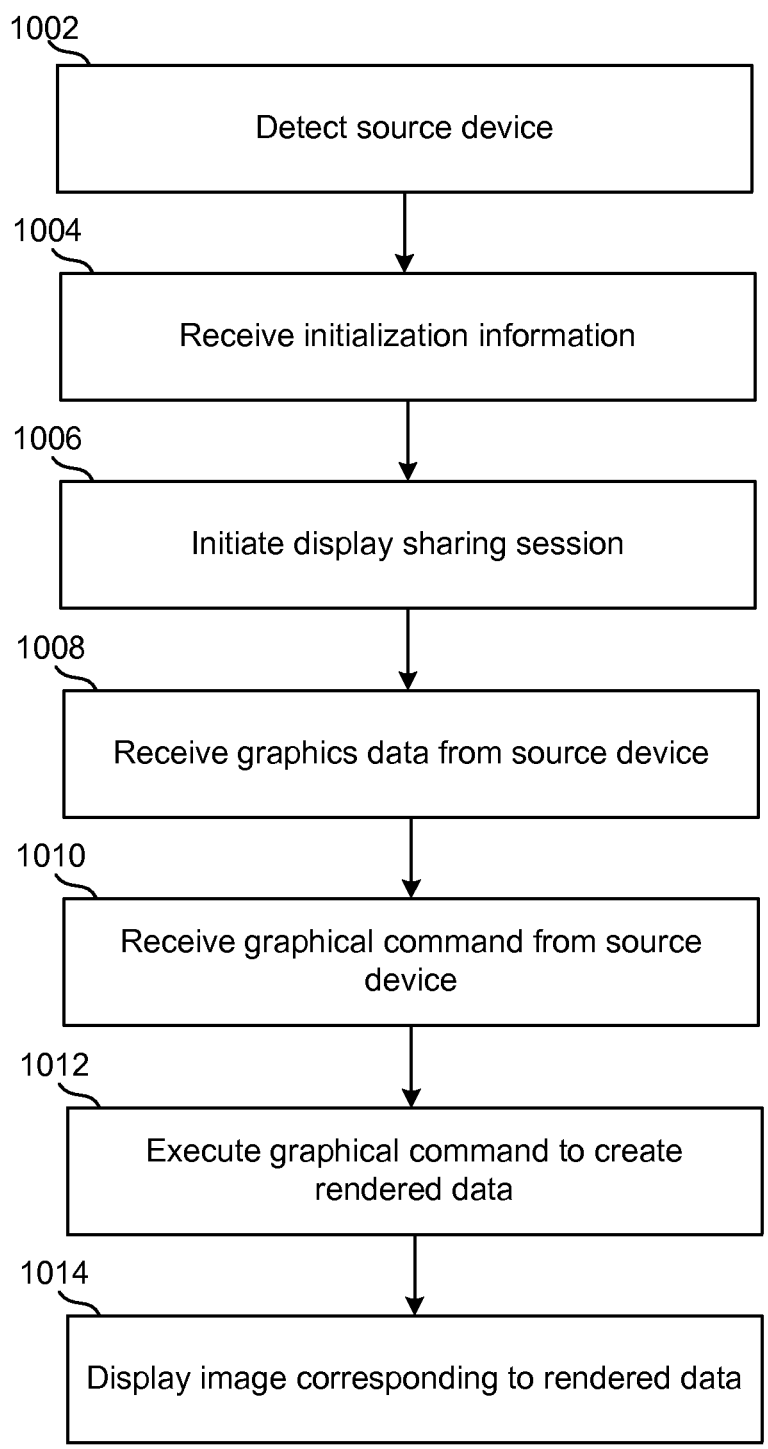
FIG. 10 illustrates display sharing according to one aspect of the present disclosure.

FIG. 10 illustrates display sharing operations as performed by a target device according to one aspect of the present disclosure. A target media device 104(T) may detect a source device, as shown in block 1002. The target media device 104(T) may receive initialization information, as shown in block 1004. The target media device 104(T) may also send its own configuration information to the target media device 104(T), not shown. The target media device 104(T) may then initiate a display sharing session, as shown in block 1006. The display sharing session may be initiated in response to an instruction to do so from the source device. The target media device 104(T) may receive graphical data from the source device, as shown in block 1008. The graphical data may be received as part of the initialization process, as part of the display sharing session, or as part of an out-of-band communication that is not part of the display sharing session. The target media device 104(T) may receive a graphical command from the source device, as shown in block 1010. The target media device 104(T) may also receive information regarding when the graphical command is to be executed and/or when a corresponding image should be displayed by the target media device 104(T). The target media device 104(T) may then execute the graphical command to create rendered image data, as shown in block 1012. The rendered image data may be formatted for the display of the target media device 104(T). The target media device 104(T) may then display an image corresponding to the rendered data, as shown in block 1014. The image may correspond to a similar image being displayed on the source media device.

Those having ordinary skill in the art will readily recognize that certain steps or operations illustrated in in the figures above can be eliminated or taken in an alternate order. Moreover, the methods described above may be implemented as one or more software programs for a computer system and are encoded in a computer readable storage medium as instructions executable on one or more processors.

The computer readable storage medium can be any one of an electronic storage medium, a magnetic storage medium, an optical storage medium, a quantum storage medium and so forth. Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations.

Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A computer-implemented method for wirelessly displaying images from a mobile device on a television, the method comprising:
    at a mobile device:
        sending initialization information to the television, the initialization information comprising configuration information of the mobile device and graphical data;
        receiving display configuration information from the television, the display configuration information comprising configuration information of a display of the television;
        operating an application;
        generating, by the application, a call to an application programming interface;
        generating, by the application programming interface, a first graphical command, wherein the first graphical command is executable by a graphics processor and operates on the graphical data to generate pixel data, the graphical data including at least one of pre-rasterized data and pre-rendered data;
        sending the first graphical command to the television;
        executing the first graphical command by a graphics processor of the mobile device to generate first rendered image data, wherein the first rendered image data is generated based on a resolution of a display of the mobile device; and
        displaying a first image on the display of the mobile device, wherein the first image is based on the first rendered image data.

2. The method of claim 1, further comprising:
    at the television:
        receiving the graphical data from the mobile device;
        receiving the first graphical command from the mobile device;
        executing the first graphical command by a graphics processor of the television to generate second rendered image data, wherein the second rendered image data is generated based on a resolution of the display of the television; and
        displaying a second image on the display of the television, wherein the second image is based on the second rendered image data and the second image corresponds to the first image.

3. The method of claim 1, wherein:
the first graphical command is in a first format when generated by the application programming interface, the first format corresponding to the display of the mobile device;
the first graphical command is in the first format when executed by the graphics processor; and
the method further comprises, by the mobile device, reformatting the first graphical command into a second format prior to sending the first graphical command to the television, the second format based at least in part on the received display configuration information.

4. A computing device, comprising:
at least one processor, including a graphics processor; and
a memory device including instructions operable to be executed by the at least one processor to perform a set of actions, configuring the at least one processor:
to operate an application;
to generate a graphical command based on operation of the application, wherein the graphical command is formatted for execution by a graphics processor and operates on at least one of pre-rasterized data and pre-rendered data to generate pixel data;
to send the graphical command to a second device;
to execute the graphical command by the graphics processor to generate display data, wherein the display data is generated based on a resolution of a display communicatively connected to the computing device; and
to send the display data to the display.

5. The computing device of claim 4, wherein the pre-rasterized data comprises vector data.

6. The computing device of claim 4, wherein the graphical command is generated by an application programming interface.

7. The computing device of claim 6, wherein the application programming interface is at least one of a graphics library or graphics library wrapper.

8. The computing device of claim 4, wherein the graphical command is formatted for execution by the graphics processor.

9. The computing device of claim 4, wherein the graphical command comprises a call to a graphics library.

10. The computing device of claim 4, the at least one processor is further configured:
to generate the graphical command in a first format, the first format corresponding to a configuration of the computing device; and
to reformat the graphical command into a second format prior to sending the graphical command to the second device.

11. The computing device of claim 10, wherein the second format corresponds to a configuration of the second device.

12. The computing device of claim 4, wherein the at least one processor is further configured:
to execute the graphical command to generate first rendered image data, wherein the first rendered image data is generated based at least in part on a display configuration of the computing device; and
to display a first image on the display of the computing device, wherein the first image is based on the first rendered image data.

13. The computing device of claim 12, wherein the first image is displayed at a first time, and the at least one processor is further configured to:
send an instruction to the second device to execute the graphical command to display a second image on a display of the second device at substantially the first time, the second image to correspond to the first image.

14. The computing device of claim 4, wherein the at least one processor is further configured:
to send graphical data to the second device; and
to send an instruction to the second device to begin a display sharing session,
wherein the at least one processor is configured to send the graphical data prior to sending the instruction.

15. The computing device of claim 14, wherein the graphical command operates on the graphical data.

16. The computing device of claim 4, wherein the at least one processor is further configured:
to operate a second application;
to generate a second graphical command based on operation of the second application; and
to send the second graphical command to a third device.

* * * * *